(12) United States Patent
Black (10) Patent No.: US 11,781,603 B2
(45) Date of Patent: Oct. 10, 2023

(54) CONE CLUTCH SYSTEM (71) Applicant: Rolls-Royce Corporation, Indianapolis, IN (US)

(72) Inventor: Joseph D. Black, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 17/930,239

(22) Filed: Sep. 7, 2022

(65) Prior Publication Data

US 2023/0073715 A1    Mar. 9, 2023

Related U.S. Application Data

(60) Provisional application No. 63/241,379, filed on Sep. 7, 2021.

(51) Int. Cl.
| | |
|---|---|
| *F16D 13/72* | (2006.01) |
| *F16D 13/66* | (2006.01) |
| *F16D 13/24* | (2006.01) |

(52) U.S. Cl.
CPC .............. *F16D 13/72* (2013.01); *F16D 13/24* (2013.01); *F16D 13/66* (2013.01)

(58) Field of Classification Search
CPC .......... F16D 13/24; F16D 13/66; F16D 13/72; F02C 7/32
See application file for complete search history.

(56) References Cited

U.S. PATENT DOCUMENTS

| | | |
|---|---|---|
| 2,865,481 A | 12/1958 | Termala |
| 3,300,004 A | 1/1967 | Peterson |
| 3,823,802 A | 7/1974 | Winzeller et al. |
| 4,030,583 A | 6/1977 | Miller |
| 4,262,789 A | 4/1981 | Collins |
| | (Continued) | |

FOREIGN PATENT DOCUMENTS

| | | | |
|---|---|---|---|
| EP | 1342932 B1 | 4/2008 | |
| EP | 3273085 A1 * | 1/2018 | ........... F16D 23/025 |

OTHER PUBLICATIONS

Lighter Rotors More Muscle, retrieved from https://www.ceramicdisctech.com on Jul. 21, 2021, 2 pp.

(Continued)

*Primary Examiner* — Lori Wu
(74) *Attorney, Agent, or Firm* — Shumaker & Sieffert, P.A.

(57) ABSTRACT

In examples, a cone clutch assembly includes an inner cone member rotationally coupled to a first shaft, the inner cone member defining a first friction surface; and an outer cone member rotationally coupled to a second shaft, the outer cone member defining a second friction surface opposing the first friction surface. The inner cone member and outer cone member may be selectively engaged and disengaged from another. When the inner cone member is engaged with the outer cone member, the first friction surface of the inner cone member frictionally engages the second friction surface of the outer cone member such that rotational motion is transferred between the inner cone member and the outer cone member. The inner cone member includes at least one hole including an inlet near a front edge of the inner cone member and that extends through the inner cone member adjacent to the first friction surface.

20 Claims, 7 Drawing Sheets

(56) References Cited

U.S. PATENT DOCUMENTS

| | | |
|---|---|---|
| 4,593,801 A | 6/1986 | Tekeuchi et al. |
| 6,834,751 B1 | 12/2004 | Magee |
| 7,308,977 B2 | 12/2007 | Maguire et al. |
| 7,799,250 B2 | 9/2010 | Huener et al. |
| 8,051,968 B2 | 11/2011 | Arnold et al. |
| 8,100,239 B2 | 1/2012 | Swanson et al. |
| 8,893,868 B2 | 11/2014 | Kennedy |
| 9,921,037 B2 | 3/2018 | Wadley et al. |
| 10,830,286 B2 | 11/2020 | Zhang et al. |
| 2004/0159524 A1 | 8/2004 | Carpenter et al. |
| 2006/0049017 A1* | 3/2006 | Furuichi ............... F16D 25/123 192/30 W |
| 2006/0180423 A1 | 8/2006 | Kos et al. |
| 2007/0023253 A1 | 2/2007 | Wayman |
| 2009/0114498 A1* | 5/2009 | Arnold ................ F16H 57/0434 192/70.12 |
| 2011/0259699 A1 | 10/2011 | Swanson |
| 2015/0211586 A1 | 7/2015 | Hutchinson |
| 2015/0267765 A1 | 9/2015 | Kim et al. |
| 2016/0084321 A1 | 3/2016 | Mihajlovic et al. |
| 2016/0178016 A1* | 6/2016 | Swift ....................... F02C 7/36 192/30 R |
| 2018/0112720 A1 | 4/2018 | Choi et al. |
| 2018/0266493 A1 | 9/2018 | Dempfle et al. |
| 2019/0120309 A1 | 4/2019 | Sung et al. |
| 2021/0054883 A1 | 2/2021 | Grethel et al. |
| 2021/0207671 A1 | 7/2021 | Siegel et al. |

OTHER PUBLICATIONS

U.S. Appl. No. 17/446,893, filed Sep. 3, 2021, by Bartolomeo et al.
U.S. Appl. No. 17/564,288, filed Dec. 29, 2021, by Black et al.
Zelinski, "Lighter, Better-Performing Brake Rotor From 3D Printing: The Cool Parts Show #27," Additive Manufacturing, Mar. 31, 2021, 6 pp.

* cited by examiner

CONE CLUTCH SYSTEM

This application claims the benefit of U.S. Provisional Patent Application No. 63/241,379, filed Sep. 7, 2021, the entire content of which is incorporated herein by reference.

TECHNICAL FIELD

The disclosure relates to cone clutch assemblies and systems that include the same.

BACKGROUND

Gas turbine engines include various accessory components to enable the engine to operate, such as, for example, fuel pumps, oil pumps, electric generators and/or motors. Often, accessory components are driven by a turbine through an accessory gearbox. In some implementations, accessory components are rotationally coupled to the accessory gearbox using a mechanical clutch, which allows selective disconnection of the accessory components from the gearbox and turbine when the accessory components are not needed.

SUMMARY

The disclosure describes cone clutch assemblies, systems including such assemblies, and techniques for making and using the same. An example cone clutch assembly may include an inner cone member (or "male cone") that is configured to selectively engage an outer cone member (or "female cone"), e.g., with one or more layers of a friction material between the opposing surfaces of the inner and outer cone members. The inner cone member may include one or more cooling holes extending from the front edge to the back edge of the inner cone member adjacent to the friction surface of the inner cone member. The cooling hole(s) may be configured to receive a fluid such as an oil that acts as a cooling fluid, e.g., during operation of the clutch assembly. The fluid may be delivered to the front side of the inner cone member, e.g., by one or more fluid delivery holes formed in the outer cone member. The delivered fluid may be forced outward by centrifugal forces along the front surface of the inner cone member and directed into the cooling holes by a protruding ledge formed on the front edge of the inner cone member by the cooling hole. In some examples, the cooling holes may include one or more vias or through holes running from the cooling holes to the friction surface of the inner cone member (e.g., to supply oil and cooling to the friction surface).

In some examples, the disclosure describes a cone clutch assembly comprising an inner cone member configured to be rotationally coupled to a first shaft, the inner cone member defining a first friction surface; and an outer cone member configured to be rotationally coupled to a second shaft, the outer cone member defining a second friction surface opposing the first friction surface, wherein the inner cone member and outer cone member are configured to be selectively engaged and disengaged from each other, wherein, when the inner cone member is engaged with the outer cone member, the first friction surface of the inner cone member frictionally engages the second friction surface of the outer cone member such that rotational motion is transferred between the inner cone member and the outer cone member, and wherein the inner cone member includes at least one hole including an inlet near a front edge of the inner cone member and that extends through the inner cone member adjacent to the first friction surface.

In some examples, the disclosure describes a method of operating a cone clutch assembly, the method comprising engaging an inner cone member with the outer cone member, wherein the inner cone member is rotationally coupled to a first shaft and defines a first friction surface, wherein the outer cone member is rotationally coupled to a second shaft and defines a second friction surface opposing the first friction surface, wherein, when the inner cone member is engaged with the outer cone member, the first friction surface of the inner cone member frictionally engages the second friction surface of the outer cone member such that rotational motion is transferred between the inner cone member and the outer cone member, and wherein the inner cone member includes at least one hole including an inlet near a front edge of the inner cone member and that extends through the inner cone member adjacent to the first friction surface.

The details of one or more examples are set forth in the accompanying drawings and the description below. Other features, objects, and advantages will be apparent from the description and drawings, and from the claims.

DETAILED DESCRIPTION

The disclosure generally describes systems including a cone clutch assembly, and techniques for using the same. The cone clutch assembly may include an inner cone member (or "male cone") that is configured to selectively engage an outer cone member (or "female cone"), e.g., with one or more layers of a friction material between the opposing surfaces of the inner and outer cone members. The inner cone member may include one or more cooling holes extending from the front edge to the back edge of the inner cone member adjacent to the friction surface of the inner cone member. The cooling hole(s) may be configured to receive a fluid such as an oil that acts as a cooling fluid, e.g., during operation of the clutch assembly. The fluid may be delivered to the front side of the inner cone member, e.g., by one or more fluid delivery holes formed in the outer cone member. The delivered fluid may be forced outward by centrifugal forces along the front surface of the inner cone member and directed into the cooling holes by a protruding ledge formed on the front edge of the inner cone member by the cooling hole. In some examples, the cooling holes may include one or more vias or through holes running from the cooling holes to the friction surface of the inner cone member (e.g., to supply oil and cooling to the friction surface).

In some examples, cone clutch assemblies may be used to control engagement of system accessories, such as aircraft accessories of gas turbine engine systems. For example, a cone clutch may be used to selectively drive system accessories of an aircraft using a gas turbine engine that provides the primary propulsion for the aircraft. In some examples, the clutch assembly may be employed to selectively engage and disengage a reduction gearbox which drives a propeller for forward thrust of an aircraft such as a helicopter. The cultch may be driven by an engine via the helicopter reduction gearbox.

A cone clutch assembly may have an input and an output shaft selectively coupled or decoupled (also referred to as engaged and disengaged) by two mating cone members. The input shaft may be continually driven by prime mover such as an engine or motor. The output shaft of the clutch can be engaged or disengaged from the prime mover allowing it to drive or disconnect driven assemblies such as gearboxes, fans, generators, etc. The cone members may be selectively engaged or coupled together by application of an axial force to clamp the inner (male) and outer (female) cone members together via friction. Typically, one cone member may be constructed from steel and the other member incorporates a friction liner to uniformly control friction and provide wear resistance. The liner may be used to control friction and improve wear resistance, and may be fabricated from materials such as bronze, carbon/carbon, Kevlar fiber encapsulated by a binder material or other friction tolerant materials to provide the clutch function. The steel cone member may be case or core hardened for durability.

Cone clutches may offer a number of significant advantages over other styles of clutches in terms of compact packaging and low weight. Power density and circumferential velocities at the rubbing surfaces control the package size of the arrangement. These limitations are driven by wear and temperatures at the rubbing surfaces of the clutch.

However, the friction surfaces between the two mating cone members can be difficult to cool for high speed/high tip velocity applications. Oil (or other fluid) supply normally provides the cooling medium for the cone members. However, the friction interface between the cone members can be very difficult to oil cool. For friction liners without oil cooling slots, active cooling may only take place before and after the clutch engagement. During the engagement, the oil flow is cut off at the friction interface. Cooling channels may be added to the friction liner mounted on the outer cone member (female) to provide a path for oil cooling. However, the inner cone member (male) may still be difficult to cool with this arrangement since cooling oil is driven out to the outer/female cone member via windage and/or centrifugal forces. The inner cone (male) member may receive very little oil at the friction surface. Oil cooling may also be targeted at the inner diameter of the inner/male cone member; however, cooling effectiveness may be limited by the thick radial section used for the cone section. This thick section may be required to maintain a high stiffness for the inner/male cone member and thus prevents distortion of the cone angle to avoid cone angle mismatches with the mating member. Mismatched cone angles lead to high heat loading and wear due to reduced contact area.

In accordance with examples of the disclosure, a cone clutch assembly may include an inner cone member including at least one cooling hole with an inlet adjacent to the front edge of the inner cone member. The cooling hole(s) may extend towards the back surface of the inner cone member adjacent to the friction surface of the inner cone member. The cooling hole(s) may be configured to receive a fluid such as a cooling oil that acts as a cooling fluid, e.g., during operation of the clutch assembly. For example, the fluid may be delivered to the front surface of the inner cone member by an oil jetting member or other fluid delivery device. In some examples, the cooling holes may include an elongated (e.g., oval) cross-sectional shape to increase the surface area of the cooling hole adjacent to the friction surface. The cooling hole(s) may include one or more vias or through holes running from the cooling hole(s) to the opposing (friction) surface of the inner cone member (e.g., to supply oil and cooling to the friction surface).

As described herein, cone clutch assemblies in accordance with the present disclosure may incorporate one or more cooling holes within the inner cone (male) member to provide higher cooling effectiveness without sacrificing the radial stiffness needed to control the cone angle. The cooling holes can be eloxed into the cone and positioned near the friction surface for maximum cooling effectiveness. Eloxing may be a manufacturing method that uses an electrical current delivered to a conductive probe (rod). The probe then arcs away (removes) metal slowly. Eloxing may also be referred to as Electrical Discharge Manufacturing (EDM). The advantage over a drill (which may be used in other examples to formed the cooling holes) is that eloxing may not use any or negligible tool pressure, therefore resulting in a straight hole that has a lot of length. A drill may "wonder" if the hole is long and the drill is a small diameter. In other instances, the cone member with cooling may be formed using other techniques such as additive layer manufacturing or additive manufacturing techniques for metal printing to provide the desired cooling hole structure. In some examples, such techniques may provide a component with cast properties being sure to design to proper stress. By eloxing the cooling holes, the shape of the cooling holes may be optimized or otherwise increased to provide maximum or relatively high cooling effectiveness.

The fins formed between the holes also serve to act both as cooling fins and stiffeners to transfer the loads into the thick lower half of the cone and thereby assure the critical cone angle is maintained. The oil is supplied to these holes via oil jets that direct oil to the front surface of the cone, e.g., as show in FIGS. 3A and 3B. From this position, centrifugal forces sling the oil outward relative to the rotation axis of the cone member. The inner cone member includes a ledge protruding near the respective inlet of the cooling holes, e.g., so as to form an oil collector channel which then distributes the oil to the cooling holes. As described herein, radial holes (also referred to as through holes) may be optionally added to the cooling holes to also provide oil to the friction surface of the inner cone member.

Figure 1:
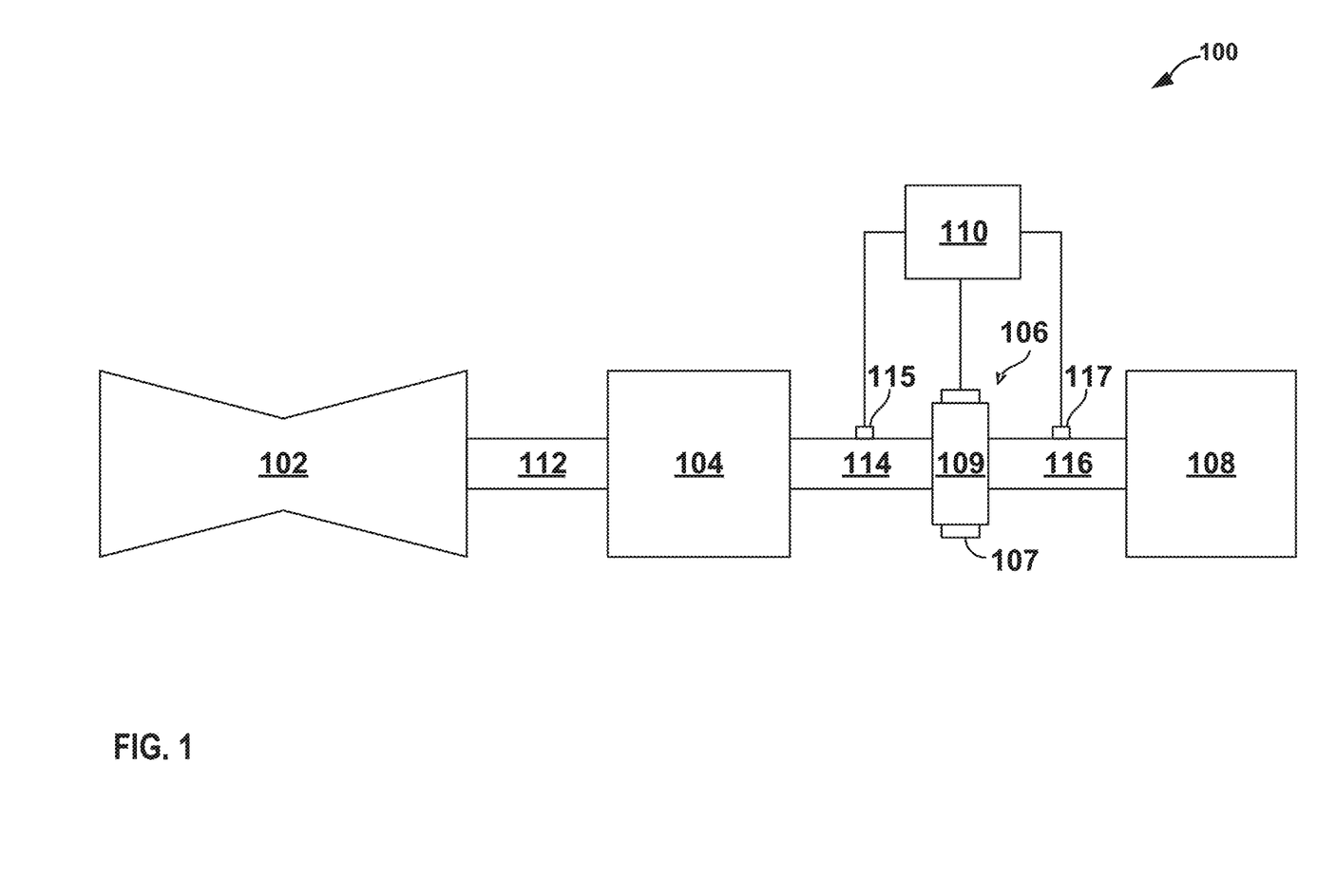
FIG. 1 is a conceptual diagram illustrating an example system including an example cone clutch assembly.

FIG. 1 is a conceptual diagram illustrating an example system 100 including cone clutch assembly 106. System 100 may include, for example, an engine 102, an accessory gear box 104, cone clutch assembly 106, an accessory component 108 (accessory 108), and a controller 110. As will be described further below, clutch assembly 106 includes two cone clutch members 109 (individually shown as outer cone member 122 and inner cone member 124 in FIG. 2 for example). System 100 may include any suitable mechanical system. In some examples, system 100 may include at least a portion of a mechanical system of a vehicle powered by an internal combustion engine. In some examples, system 100 may include at least a portion of a mechanical system of an aircraft powered by a gas turbine engine. In some examples, system 100 may form a part of a system that includes an aircraft engine (e.g., turbine engine) that drives a reduction gearbox which drives the clutch and helicopter rotor(s). The clutch may drive a reduction gearbox which drives a propeller to increase forward velocity of the helicopter. In some examples, cone clutch assembly 106 may be employed as a clutch assembly in a propulsion system for a helicopter or other rotary wing aircraft such as the examples propulsion systems described in U.S. Patent Publication No. 2022/0018415 by Sauer (U.S. patent application Ser. No. 17/335,259 filed Jun. 1, 2021), the entire content of which is incorporated herein by reference.

Engine 102 is mechanically coupled to accessory gear box 104 via drive shaft 112. Engine 102 is configured to rotate (e.g., drive) drive shaft 112. Although illustrated as a gas turbine engine, in other example, engine 102 may include other devices configured to output shaft work, such as internal combustion engines, fuel cells, electric motors or generators, pneumatic motors, or hydraulic motors.

Drive shaft 112 may include any suitable shaft and/or gear system to transfer shaft work from engine 102 to accessory gear box 104. In examples in which engine 102 includes a gas turbine engine, drive shaft 112 may include an internal gearbox including a direct drive, a stub shaft drive, an idler shaft drive, or other mechanical coupling configured to drive a radial drive shaft or tower shaft. In some examples, drive shaft 112 may include an intermediate gearbox.

Accessory gearbox 104 is configured to transfer shaft work from drive shaft 112 to input shaft 114. In some examples, accessory gearbox 104 may include an accessory drive of a gas turbine engine system. Input shaft 114 is configured to drive one or more accessories of system 100. Although illustrated as a single input shaft 114, system 100 may include two or more input shafts driven by drive shaft 112 via accessory gearbox 104. For example, accessory gearbox 104 may include a plurality of spur gears mechanically coupling drive shaft 112 to respective input shaft of a plurality of input shafts 114, each at a selected gear ratio.

Input shaft 114 may be selectively coupled to an output shaft 116 via cone clutch assembly 106 so that output shaft 116 is rotationally driven by input shaft 114 when cone clutch assembly 106 is engaged and, conversely, when cone clutch assembly 106 is disengaged, output shaft 116 is not driven by input shaft 114. Input shaft 114 may be coupled (e.g., rotationally fixed) to outer cone member 122 (shown in FIG. 2) of clutch assembly 106, and inner cone member 124 (shown in FIG. 2) of clutch assembly 106 may be coupled (e.g., rotationally fixed) to output shaft 116. As used herein, the outer cone member 122 may also be referred to as a female cone member, and the inner cone member 124 may also be referred to as a male cone member. Although system 100 is described herein primarily with outer cone member 122 being fixed to input shaft 114 and with inner cone member 124 being fixed to output shaft 116, in other examples, outer cone member 122 may be fixed to output shaft 116 and inner cone member 124 may be fixed to input shaft 114. Output shaft 116 is mechanically coupled to accessory 108. Accessory 108 may include, for example, one or more of fuel pumps, generators, constant speed drives, oil pumps, hydraulic pumps, compressors, engine starters, tachometer sensor drives, and auxiliary gearbox drives.

In some examples, system 100 may include at least one of rotational sensors 115 and 117. Rotational sensors 115 and 117 are configured to sense a rotational speed of input shaft 114 (or an outer cone member coupled to input shaft 114) and output shaft 116 (or an inner clutch plate coupled to output shaft 116), respectively. For example, rotational sensors 115 and/or 117 may include one or more of a reflective sensor, an interrupter sensor, an optical encoder, a variable-reluctance sensor, an eddy-current killed oscillator sensor, a Wiegand sensor, or a Hall-effect sensor. In some examples, rotational sensors 115 and/or 117 may be configured to determine a rotation of input shaft 114 or output shaft 116, respectively, based on sensing a target disposed on input shaft 114 (of the first clutch plate) or output shaft 116 (or the second clutch plate). In some examples, controller 110 may be configured to receive signals from at least one of rotational sensors 115 or 117 and control, based on a rotational speed determined based on the signal, an electrical current applied to electromagnet 107.

In the example shown in FIG. 1, controller 110 may selectively engaged and disengage clutch assembly 106 as described herein, e.g., to selectively drive output shaft 116 via input shaft 114. For example, as described further below, controller 110 may control the axial position of outer cone member 122 relative to inner cone member 124, e.g., via an actuator. To engage clutch assembly 106, controller 110 may move inner cone member 124 towards outer cone member 122 to frictionally engage opposing surfaces of members 122, 124. Conversely, to disengage clutch assembly, controller 110 may move inner cone member 124 away from outer cone member 122 to frictionally disengage opposing surfaces of members 122, 124.

Controller 110 may include, for example, a computing device, a desktop computer, a laptop computer, a workstation, a server, a mainframe, a cloud computing system, a tablet, a smart phone, or the like. Controller 110 is configured to control operation of system 100, including, for example, the position of outer cone member 122 relative to inner cone member 124. Controller 110 may be communicatively coupled to the various component of system 100 including, e.g., the actuator or other component configured to axially move inner cone member 124 relative outer cone member 122, sensors 115 and/or 117, and/or the like using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like. In some examples, controller 110 may include control circuitry, such as one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

Figure 2:
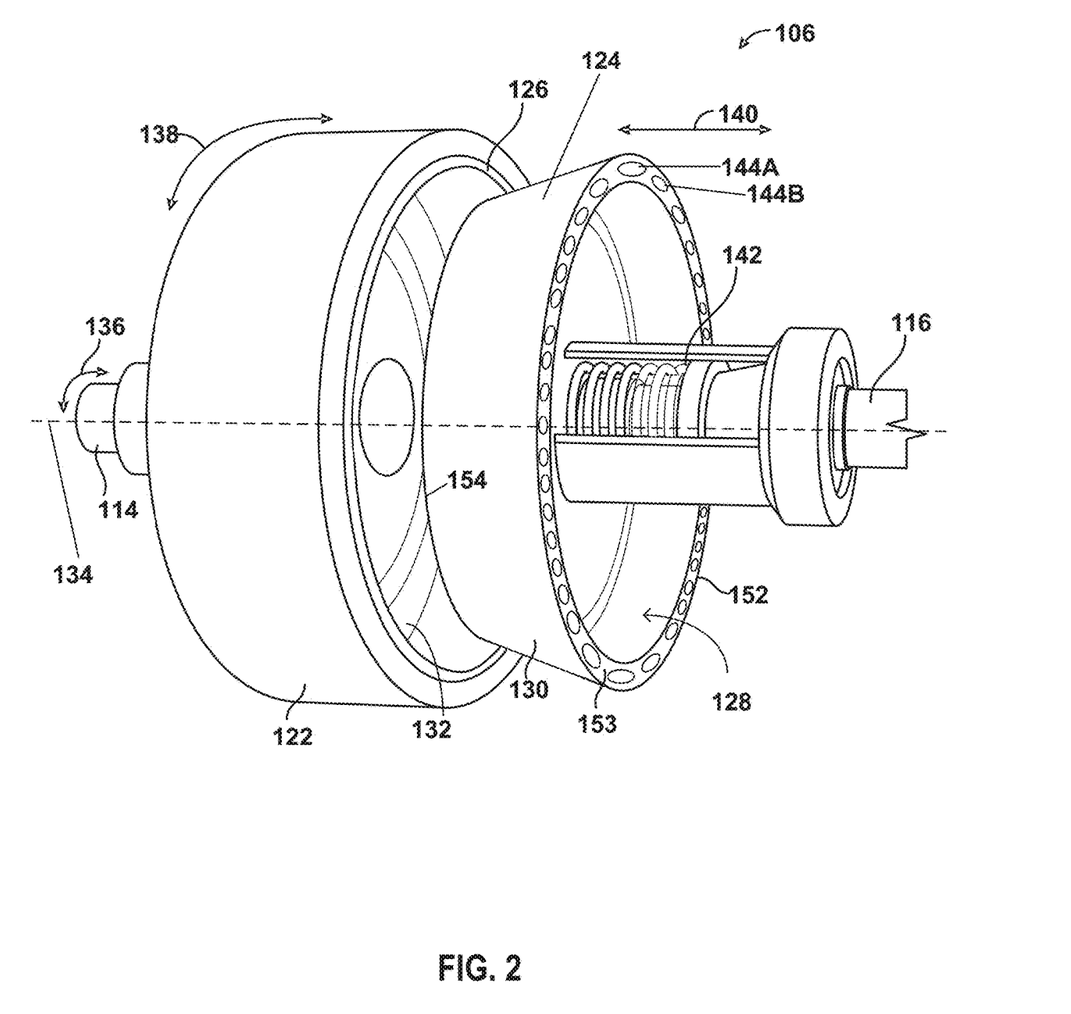
FIG. 2 is a conceptual diagram illustrating an example cone clutch assembly.
Figure 3A:
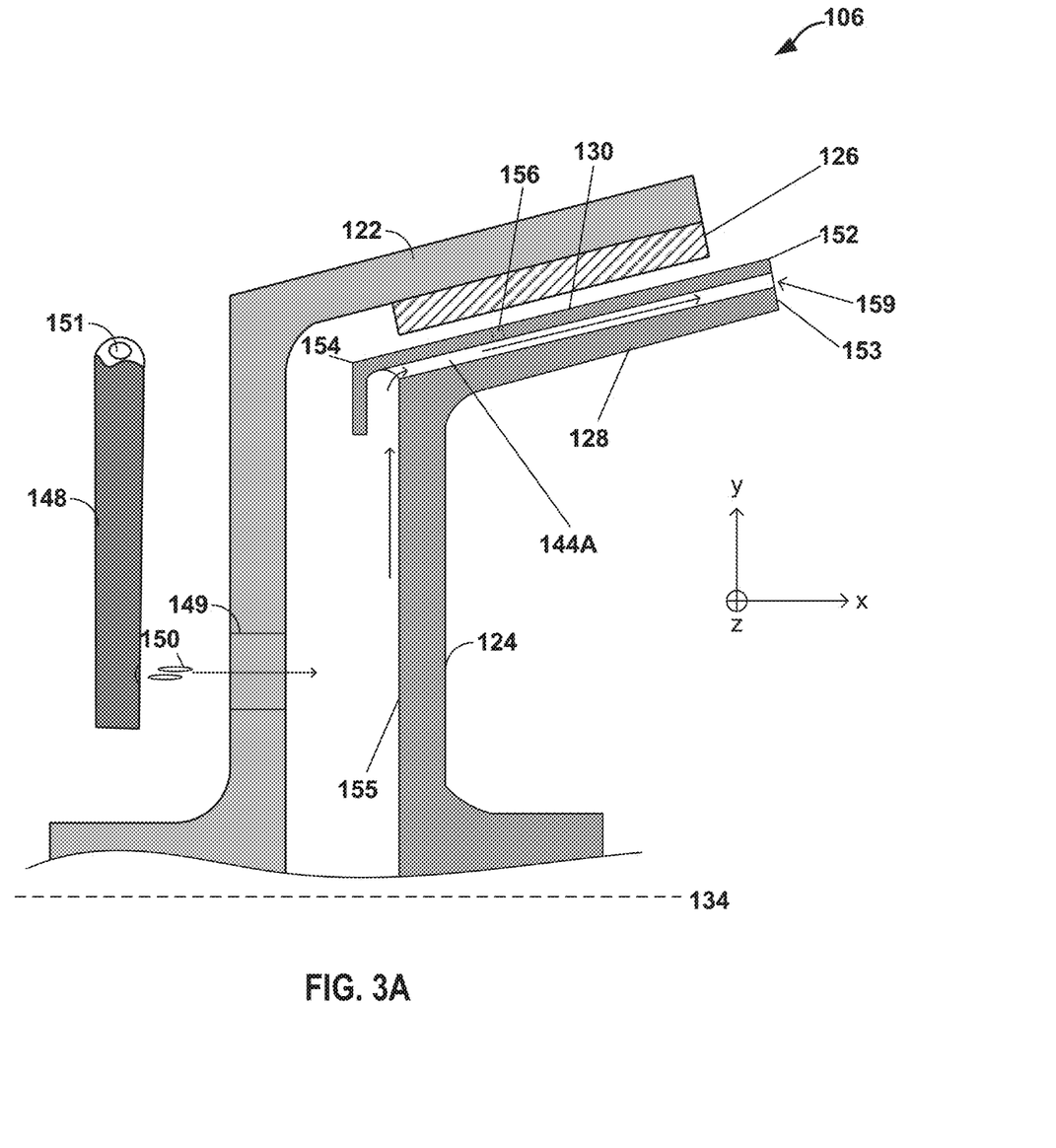
FIGS. 3A and 3B are simplified conceptual diagrams illustrating cross-sections of a portion of an example cone clutch assembly.
Figure 3B:
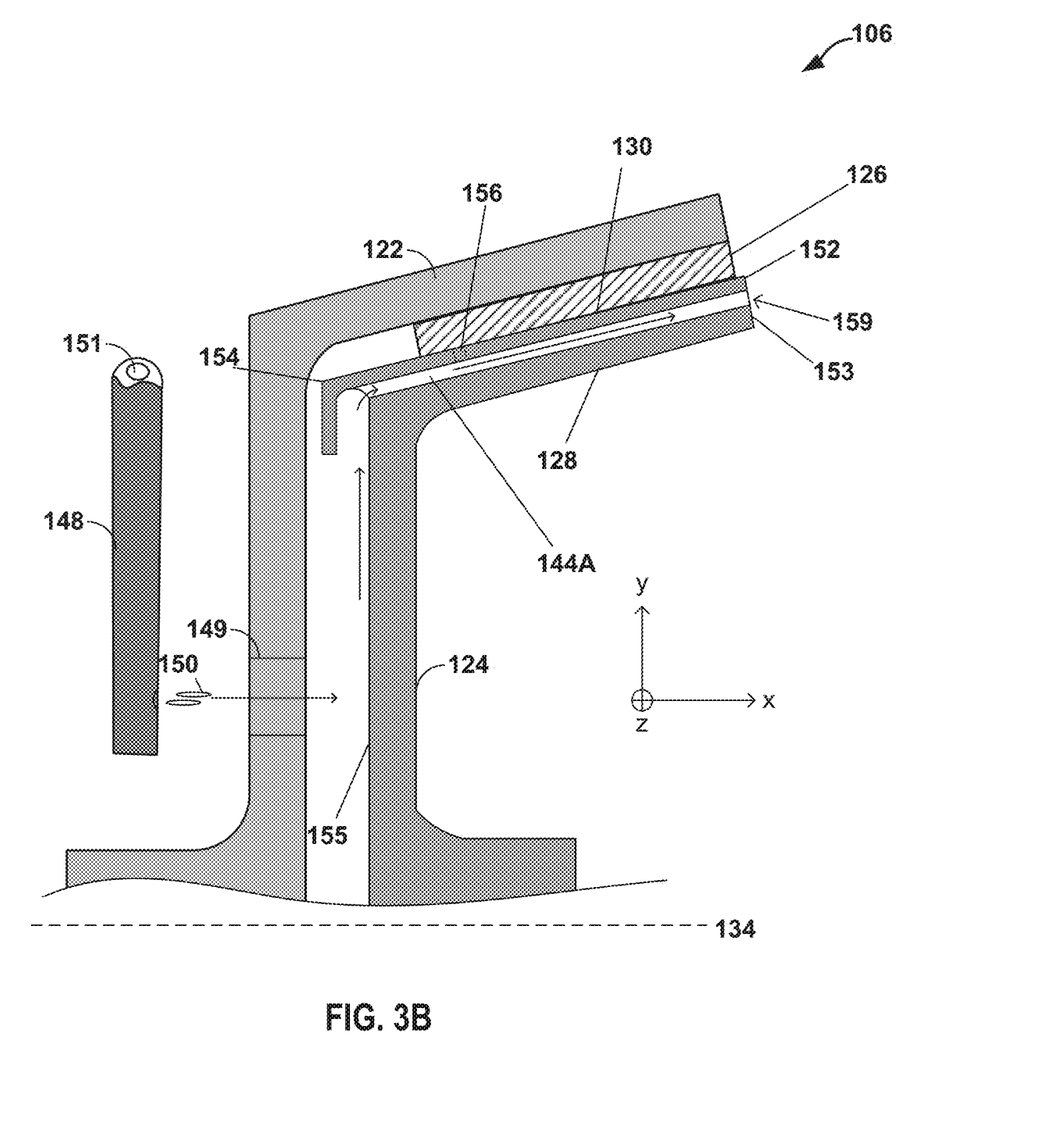
Figure 4:
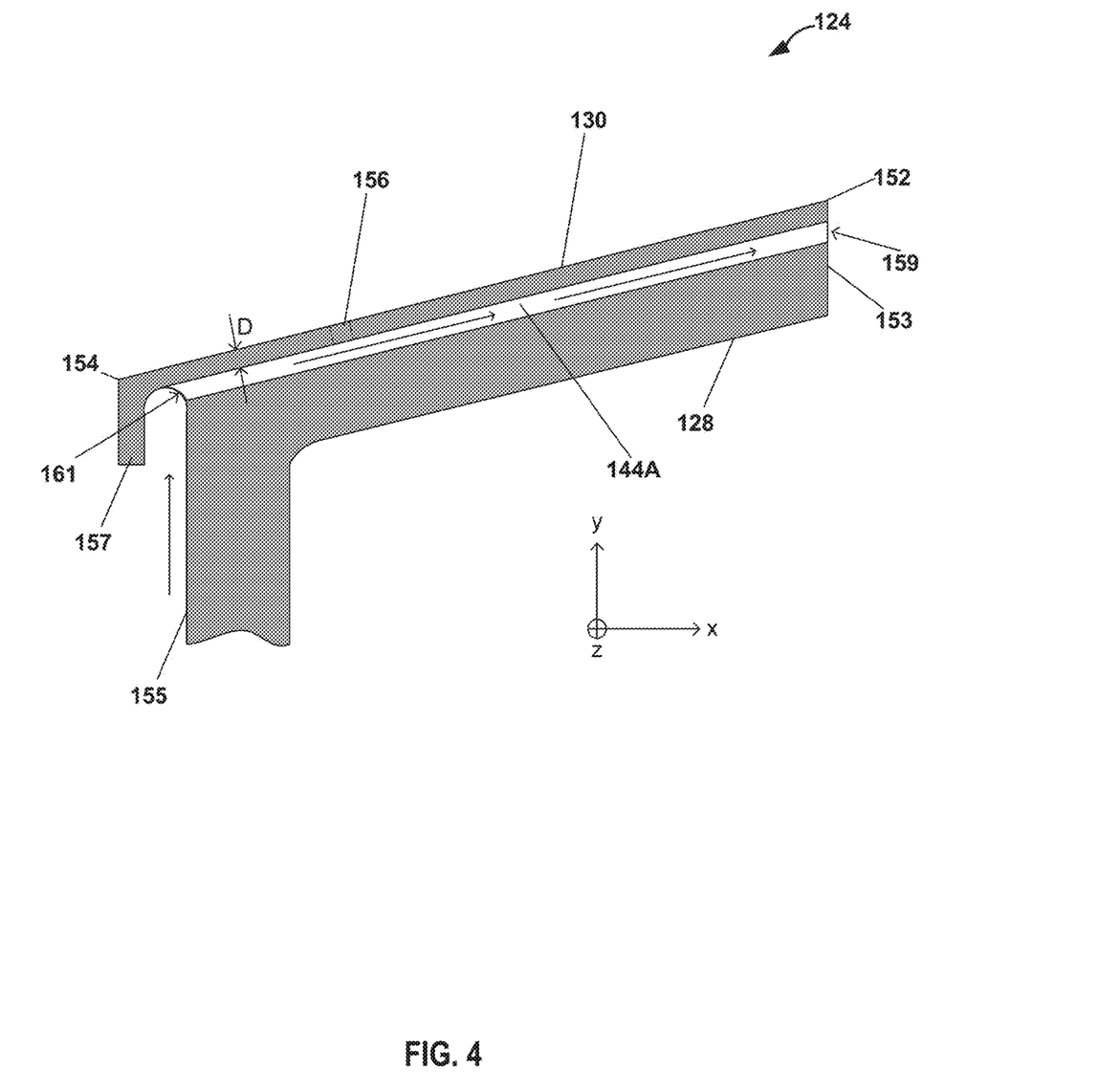
FIG. 4 is a conceptual diagram illustrating a magnified view of the inner cone member shown in FIGS. 3A and 3B.
Figure 5:
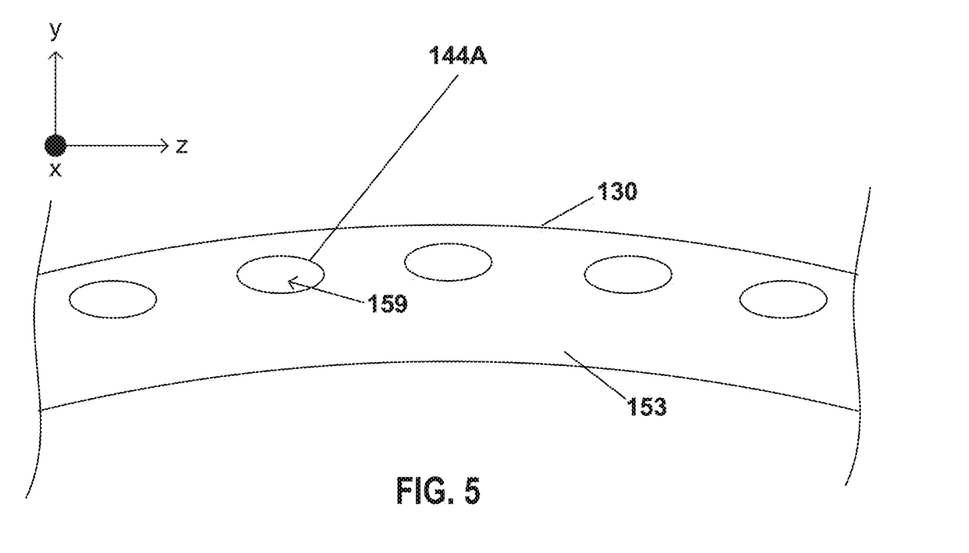
FIG. 5 is a conceptual diagram illustrating a portion of the back edge of the inner cone member shown in FIG. 4.

FIG. 2 is a conceptual diagram illustrating an example cone clutch assembly 106 that may be used in system 100. FIGS. 3A and 3B are conceptual diagrams showing a simplified cross-section of a portion of cone clutch assembly 106 in engage and disengaged, respectively configurations. FIG. 4 is conceptual diagram illustrating a magnified view of a portion of inner cone member 124 shown in FIGS. 3A and 3B showing cooling hole 144A in further detail. FIG. 5 is a conceptual diagram showing a circumferential portion of back surface 153 of inner cone member 124. While the examples of FIGS. 2-5 show a system in which the outer cone member 122 is attached to the input shaft/drive and the inner cone member 124 is attached to the output shaft/drive, it is contemplated that system 100 may be configured with outer cone member 122 attached to the output shaft/drive and the inner cone member 124 may be attached to the input shaft/drive, e.g., depending on the configuration of the driveline including which of the cone members may be more easily moved axially, and the like.

Cone clutch assembly 106 includes outer cone member 122 attached or otherwise fixed (e.g., rotationally fixed) to input shaft 114, and inner cone member 124 attached or otherwise fixed (e.g., rotationally fixed) to output shaft 116. Input shaft 114 rotates about axis 134 in direction(s) 136. Likewise, output shaft 116 rotates about axis 134 when driven by input shaft 114, e.g., when clutch assembly 106 is in an engaged configuration.

Inner cone member 124 includes outer (or friction) surface 130 and inner surface 128 that opposes outer surface 130. Outer cone member 122 include inner surface 132. In the example of FIG. 2, assembly also includes friction member 126 that is located on inner surface 132 of outer cone member 132. In other examples, friction member 126 may additionally, or alternatively, be located on outer surface 130 of inner cone member 124. Friction member 126 may be formed of a friction material that is different material than outer cone member 122 and/or inner cone member 124.

In some examples, outer cone member 122 and/or inner cone member 124 may be formed of metal and/or metal alloys such as steel, aluminum and aluminum alloy, titanium and titanium alloy, and the like. In some examples, friction member 126 may be formed of KEVLAR® (e.g., in a polymer binder), carbon fiber weave, carbon fibers in a polymer binder, carbon-carbon, sintered bronze, or other composite material. In some examples, the friction material of friction member 126 may be selected to provide an optimum or otherwise advantageous compromise of friction properties, wear, thermal resilience, heat conductivity, and the like. The material of friction member 126 may defining a wear resistant coating that has good stability, can be bonded to the inner and/or outer cone, has good lubricity, compatible to oils used and/or exhibits good temperature capability.

As shown in FIGS. 3A and 3B, with the generally conical shape, the friction surfaces of inner cone member 124 and outer cone member 122 are orientated at an angle relative to rotational axis 134 (which extends substantially parallel to the x-axis shown in FIGS. 3A and 3B) that is greater than zero and less than 90 degrees. The angle of the opposing friction surfaces of inner cone member 124 and outer cone member 122 may be generally the same so as to allow for relatively evenly distributed contact between the friction surface with the inner cone member 124 and outer cone member 122 are engaged with each other, e.g., as shown in FIG. 3B.

Inner cone member 124 also includes front surface 155 extending from at or near the rotational axis 134 towards front edge 154 of friction surface 130 at the smallest outer diameter of inner cone member 124. As will be described below, fluid delivery device 148 may selectively delivery fluid 150 such as a cooling oil to front surface 155, e.g., via port 149 during engagement between inner cone member 124 and outer cone member 122. Friction surface 130 of inner cone member 124 extends axially at an angle relative to rotational axis 134 to back edge 152.

Inner cone member 124 is moveable relative to outer cone member 122 along translation direction 140 that is substantially parallel to rotational axis 134. For ease of illustration, clutch assembly 106 is shown in FIG. 2 in a disengaged configuration, e.g., where the friction surface defined by outer surface 130 of inner cone member 124 is not in contact with friction member 126. To transition to an engaged configuration such as that shown in FIG. 3B, inner cone member 124 may be moved, e.g., under the control of controller 110, towards outer cone member 122 so that outer surface 130 engages friction member 126 on inner surface 132 of outer cone member 122. For example, spring 142 may be employed to apply an axial force to inner cone member 124 that moves inner cone member 124 towards outer cone member 122 so that outer surface 130 engages friction member 126 on inner surface 132 of outer cone member 122. Spring 142 is only one example of an actuation mechanism that may be employed by clutch assembly 106 to provide proper axial movement and axial load control, e.g., to allow for selective engagement and disengagement of clutch assembly 106.

Additionally, or alternatively, a hydraulic piston or other suitable actuator may be employed to actuate the clutch assembly as described herein, e.g., from an engaged to disengaged configurations. For example, hydraulic pressure acting on a piston may be used to actuate the clutch. The hydraulic piston pressure may be controlled by a hydraulic control unit to control the pressure. The piston may have a rod side and a head side (e.g., with pressure acting on both sides of the piston) to both actuate and retract the piston. In some examples, a Hydraulic Control Unit (HCU) or other suitable control is employed to control pressure of hydraulic fluid that is ported to both sides of a piston cavity to allow engagement and disengagement. Pressure may be required for disengagement to assure the opposing cones are not rubbing together when disengaged.

The applied force may allow for frictional engagement between the two opposing friction surfaces (outer surface of friction member 126 and outer surface 130 of inner cone member 124). The frictional engagement may allow for transfer of rotation between outer cone member 122 and inner cone member 124, e.g., so that input shaft 114 drives the rotation of output shaft 116. When engaged, the rotational speed of output shaft 116 may be approximately the same as input shaft 114 about axis 116. To disengage clutch assembly 106, the force applied by spring 142 (or other actuation mechanism) may be removed, e.g., under the control of controller 110, to allow for a gap between the two opposing friction surfaces (outer surface of friction member 126 and outer surface 130 of inner cone member 124). When disengaged, outer cone member 122 may rotate freely without rotating inner cone member 124.

As shown in FIGS. 3A and 3B (not shown in FIG. 2 for clarity of other components), clutch assembly 106 also includes fluid delivery device 148. Fluid delivery device 148 may be any device suitable for delivering cooling fluid 150 such as a cooling oil to front surface 155. For example, as partially shown in FIGS. 3A and 3B, fluid delivery device 148 may be an oil jetting device 148 supplied with oil via oil supply line 151. As shown, fluid delivery device 148 directs cooling fluid 150 to front surface 155 of inner cone member 124, e.g., via port 149 in outer cone member 122 and under the control of controller 110. Fluid 150 may be any suitable cooling fluid. Example cooling fluids may include a cooling oil with a relatively high heat capacity. Fluid 150 may be liquid fluid. In some examples, cooling fluid 150 may be a cooling oil that also functions as a lubricating oil for the friction surfaces of the inner and outer cone members. In some examples, fluid 150 may be a diester oil typically used within gas turbine engine applications, e.g., to avoid the use of multiple oil systems which would add weight to the overall system. The oil flow may be controlled by an orifice and then routed to the area requiring the cooling by some controlled delivery path. The thermal capability/stability of a particular fluid may be important factors when selecting fluid 150.

In accordance with some examples of the disclosure, inner cone member 124 includes at least one cooling hole such as cooling holes 144A and 144B labelled in FIG. 2 (collectively and individually referred to as cooling hole(s) 144) extending through inner cone member 124 adjacent to friction surface 130. In some examples, inner cone member 124 may only include a single cooling hole 144 while in other examples, inner cone member 124 includes a plurality of individual cooling holes, such as the example of FIG. 2 with a plurality of cooling holes 144 distributed about the outer circumference of inner cone member adjacent to friction surface 130.

As better shown in FIGS. 3A, 3B and 4, individual cooling hole 144A extends from an inlet 161 formed in front surface 155 adjacent to front edge 154 of inner cone member 124 to outlet 159 formed in back surface 153 adjacent to back edge 152. As described herein, cooling hole 144A may be configured to receive a cooling fluid such as a cooling oil that flow from front surface 155 into inlet 161 through cooling hole 144A adjacent to friction surface 130 and out of outlet 159 located in back surface 153 along the path indicated by the arrows shown in FIGS. 3A, 3B, and 4. In other examples, outlet 159 may be formed in inner surface 128.

Cooling hole(s) 144 may be configured facilitate the removal of heat or otherwise cool inner cone member 124, e.g., during operation of cone clutch assembly 106. For example, assembly 106 may be configured such that a cooling fluid (e.g., a cooling oil) is delivered to hole 144A, e.g., by a fluid delivery member 148 such as that shown in FIG. 3A, during operation of clutch assembly 106 in the engaged and/or disengaged configuration. The fluid 150 delivered to front surface 155 may be directed into inlet 161 of hole 144A (e.g., at least in part by centrifugal forces associated with the rotation of cone member 124 about axis 134), and then transferred through hole 144A so that heat may be conducted into the fluid from inner cone member 124 (e.g., as generated at friction surface 130). The cooling fluid 150 may travel through hole 144A and exit at outlet 159 in back surface 153 of inner cone member 124. The removal of the heat by the fluid 150 may provide for cooling of cone member 124 with the removal of heat as described. Beneficially, the centrifugal force applied on fluid 150 by the rotation of cone member 124 may drive the flow of fluid 150 without the need for a pump to drive the flow fluid 150 through hole 144A during operation of clutch assembly 106 in an engaged configuration.

Hole 144A may extend linearly from inlet 161 to outlet 159 in back surface 153, e.g., in a direction substantially parallel to the x-y plane indicated in FIG. 4. In other examples, cooling hole 144A may follow a non-linear path (e.g., an S-shaped path) to increase the surface area of cooling hole 144A adjacent to friction surface 130 (and increase heat conduction) as compared to a linearly extending hole.

Fluid 150 that exits out of hole 144A at outlet 159 and/or hole 156 may be captured (and optionally cooled by a heat exchanger), filtered, and then recycled back into the system (e.g., in the case of a cooling liquid). In the case of a gas fluid, the gas may be recaptured, cooled (e.g., in a heat exchanger), and recycled in some examples. In the case of air fluid, the air may be released from the system and new air may be used for the supply. In some examples, fluid 150 is scavenged out of the clutch via a scavenge pump and directed to an air/oil or fuel/oil cooler typically to remove heat from the fluid.

Hole 144A may extend through inner surface 128 to any suitable depth (D) relative to friction surface 130 In some examples, the depth D of hole 144A may be substantially constant along the length of hole 144A or may vary. In some examples, depth D may be at least about 0.02 inches, such as, about 0.02 inches to about 0.1 inches. As noted above, in some examples, cooling hole 144A extends to outlet 159 formed in back surface 153 while in other examples, outlet 159 may be formed, e.g., in inner surface 128 at a location near back surface 153.

As shown in FIG. 4, in some examples, inner cone member 124 includes a protruding ledge 157 adjacent to inlet 161 at front edge 154. Ledge 157 may facilitate the collection and/or direction of fluid 150 delivered to front surface 155 into inlet 161 of cooling hole 144A, e.g., when fluid 150 is forced outward with the rotation of inner cone member 124. As shown, ledge 157 protrudes axially from a location adjacent to inlet 161 to prevent fluid 150 from flowing past inlet 161 when forced radially outward along surface 155, e.g., by the rotation of inner cone member 124 about axis 134. Additionally, in the example of FIG. 4, ledge 157 also extend radially inward, e.g., in a undercut configuration, to form a collection channel for the collection of fluid 150 and/or direction of fluid 150 into inlet 161 when forced radially outward along surface 155. Ledge 157 may extend circumferentially around the entire radius of inner cone member 124 or only some portion thereof.

In some examples, one or more of cooling hole(s) 144 may include one or more optional through holes such as through hole 156 labeled in hole 144A shown in FIG. 4. Through hole 156 may provide a pathway for fluid 150 in cooling hole 144A to flow to friction surface 130 rather than out of outlet 159. The fluid 150 delivered to friction surface 130 may lubricate surface 130 and/or remove additional heat from friction surface 130. While a single through hole is shown, in other examples, individual cooling holes 144 may include multiple through holes, or some or all individual cooling hole may not include a through hole. Additionally, in some examples, the through holes may be located nearer front edge 154, or nearer back edge 152 compared to the location of through hole 156 shown in FIG. 4.

FIG. 5 is a conceptual diagram illustrating a portion of back surface 153 of inner cone member 124. As shown, inner cone member 124 includes a plurality of cooling holes 144 such as cooling hole 144A with outlet 159 formed in back surface 153. As described herein, fluid 150 may exit out of the respective outlets 159 of cooling the holes 144 after flowing adjacent to friction surface 130. The portion of inner cone member 124 that exist between respective cooling holes 144 may function as cooling fins for heat transfer and/or stiffening ribs to stiffen or otherwise transfer the loads axially into inner cone member 124 towards front surface 155.

The view FIG. 5 illustrates that the individual cooling holes 144 such as cooling hole 144A may have an elongated or non-circular cross-section, e.g., with a surface nearest to friction surface 130 being greater than the surface of hole 144A extending orthogonal from surface 130. For example, in FIG. 5, cooling hole 144A has an elongated circular cross-section with the largest dimensional surface extending approximately parallel to the plane of surface 130. In this manner, the amount of surface area available to conduct heat away from friction surface 130 to fluid 150 flowing within holes 144 may be increased, e.g., relative to circular holes.

While the cross-section of holes 144 is shown in FIG. 5 as being the same for each individual hole, in other examples, the cross-sectional shape may vary between holes. Additionally, rather than having elongated circular shaped cross-sections, other suitable cross-sectional shapes may be employed, such as rectangular, triangular, or other polygonal shapes. In some examples, the cross-sectional area of cooling holes 144, such as cooling hole 144a may be no smaller than about 0.030 inches to about 0.25 inches.

As described above, cooling holes 144 may be formed using any suitable technique including eloxing techniques to form cooling holes 144 in inner cone member 124 (which may be formed by casting inner cone member 124 without cooling holes and then eloxed to form cooling holes 144). In some examples, additive manufacturing techniques for depositing metal may be employed to form inner cone member 124 with cooling holes 144.

Figure 6:
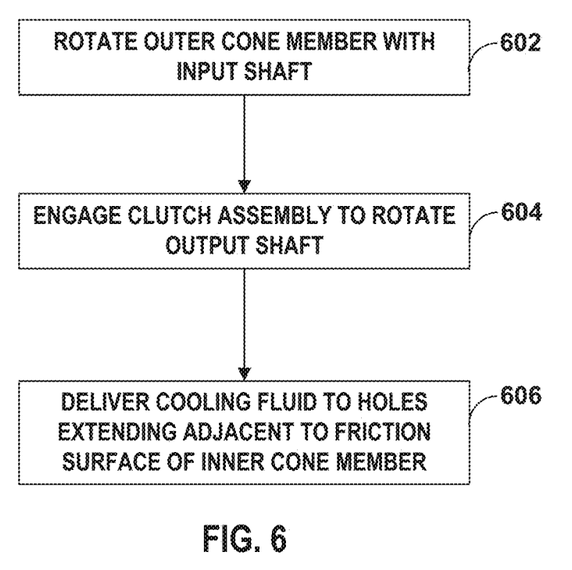
FIG. 6 is a flow diagram illustrating an example technique for operating a system including a cone clutch assembly in accordance with some examples of the disclosure.

FIG. 6 is a flow diagram illustrating an example technique for controlling engagement of an engine with an accessory using a cone clutch assembly. Using the technique of FIG. 6, controller 110 may control system 100 to selectively transfer rotational motion from accessory gear box 104 to accessory component 108 via clutch assembly 106 while also cooling clutch assembly 106 as described herein. For ease of description, the example of FIG. 6 will be described with regard to system 100 and cone clutch assembly 106 described above with regard to FIGS. 2, 3A, 3B, and 4. However, the technique may be used to control other systems and clutch assemblies. Additionally, system 100 and cone clutch assembly 106 may be controlled using other techniques.

The technique illustrated in FIG. 6 may include rotating outer cone member 122 around rotational axis 134 by the rotation of input shaft 112 (602). As discussed above, engine 102 may be configured to rotate input shaft 112, e.g., via drive shaft 112, accessory gear box 104, and input shaft 114. Inner cone member 124 may be disengaged from outer cone member 122 during the rotation of outer cone member 122, e.g., with spring 142 not applying an axial force that forces the friction face of inner cone member 124 against friction member 126 of outer cone member 122. As described above, when disengaged, a gap may be present between the respective friction surfaces of inner cone member 124 and outer cone member 122.

Controller 110 may then selectively engage clutch assembly 106 to transfer rotational motion from input shaft 114 to output shaft 116, e.g., to drive accessory 108 (604). For example, controller 110 may actuate spring 142 to apply an axial force to inner cone member 124 that moves inner cone member 124 towards outer cone member 122 so that outer surface 130 engages friction member 126 on inner surface 132 of outer cone member 122. The applied force may allow for frictional engagement between the two opposing friction surfaces (outer surface of friction member 126 and outer surface 130 of inner cone member 124). The frictional engagement may allow for transfer of rotation between outer cone member 122 and inner cone member 124, e.g., so that input shaft 114 drives the rotation of output shaft 116.

During the engagement of inner cone member 124 and outer cone member 122, controller 110 may control fluid delivery member 148 to delivery fluid 150 to front surface 155 of inner cone member 124 through port 149. Fluid 150 may be deposited or otherwise be delivered from fluid delivery member 150 into cooling holes 144 such as cooling hole 144A. For example, the delivered fluid 150 may flow radially outward along front surface 155 and be directed into inlet 161 of cooling hole 144A by ledge 157, e.g., based on the centrifugal force associated with the rotation of inner cone member 124. At least a portion of the delivered fluid 150 may flow through cooling hole 144A and exit out outlet 159 in back surface 153 of inner cone member 124 to remove heat from inner cone member 124. In examples in which inner cone member 124 includes optional through holes 156, a portion of the delivered fluid 150 may be transferred to the friction surface 130 of inner cone member 124.

In some examples, controller 110 may delivery fluid 150 to front surface 155 when inner cone member 124 is engaged with outer cone member 122, e.g., with the delivery of fluid 150 being ceased with inner cone member disengages from outer cone member 122. Alternatively, or additionally, system 106 may include a temperature sensor so that controller 110 may deliver fluid 150 to cool inner cone member 124 whenever inner cone member reaches a temperature above a predetermined threshold. In still other examples, system 106 may be configured to deliver flow of fluid 150 substantially continuously. During engagement, heat may build up quickly because of the short duration of the engagement and system 106 needs to continue to cool for a short amount of time after the engagement. In some examples, the flow rate after this time period may be reduced to reduce oil flow.

Controller 110 may control the delivery of fluid 150 in a manner that provides for a desired amount of heat removal from inner cone member 124, e.g., to reduce the temperature, maintain the temperature, or reduce the rate of temperature increase of inner cone member 124. In some examples, controller 110 may increase or decrease the amount of fluid 150 delivered to front surface 155 to increase or decrease, respectively, the amount or rate of heat remover from inner cone member 124, as desired. The amount of fluid 150 delivered may be adjusted by adjusting the flow rate of fluid 150 out of fluid delivery device 148. In some examples, fluid delivery device 148 may delivery fluid 150 on a substantially continuous basis or periodically under the control of controller 110. Although not shown in FIG. 6, controller 110 may selectively disengage cone clutch assembly 106 to stop driving the rotation of output shaft 116. When cone clutch assembly 106 is disengaged, fluid delivery member 148 may cease the delivery of fluid 150 to front surface 155 of inner cone member 124 or may continue to delivery fluid 150, if desired.

Various examples have been described. These and other examples are within the scope of the following clauses and claims.

Clause 1. A cone clutch assembly comprising: an inner cone member configured to be rotationally coupled to a first shaft, the inner cone member defining a first friction surface; and an outer cone member configured to be rotationally coupled to a second shaft, the outer cone member defining a second friction surface opposing the first friction surface, wherein the inner cone member and outer cone member are configured to be selectively engaged and disengaged from each other, wherein, when the inner cone member is engaged with the outer cone member, the first friction surface of the inner cone member frictionally engages the second friction surface of the outer cone member such that rotational motion is transferred between the inner cone member and the outer cone member, and wherein the inner cone member includes at least one hole including an inlet near a front edge of the inner cone member and that extends through the inner cone member adjacent to the first friction surface.

Clause 2. The clutch assembly of clause 1, wherein the assembly includes a fluid delivery device configured to deliver a fluid to a front side of the inner cone member, wherein the delivered fluid is configured to be directed into the inlet of the at least one cooling hole and flow through the at least one cooling hole adjacent to the first friction surface.

Clause 3. The clutch assembly of clause 2, wherein the fluid delivery device comprises an oil jetting device.

Clause 4. The clutch assembly of clauses 2 or 3, wherein the inner cone member includes at least one ledge adjacent to the inlet, the at least one ledge being configured to direct the delivered fluid into the inlet of the at least one hole.

Clause 5. The clutch assembly of clause 4, wherein the at least one ledge includes a radially extending member to form a fluid collection channel adjacent to the inlet of the at least one hole.

Clause 6. The clutch assembly of any one of clauses 2-5, wherein the delivered fluid is configured to flow into the inlet of the at least one hole at least in part due to centrifugal forces applied on the fluid with rotation of the inner cone member when engage with the outer cone member.

Clause 7. The clutch assembly of any one of clauses 1 to 6, wherein the at least one hole terminates adjacent to a back edge of the inner cone member.

Clause 8. The clutch assembly of any one of clauses 1 to 7, wherein the at least one hole includes at least one through hole extending from the at least one hole to the first friction surface.

Clause 9. The clutch assembly of any one of clauses 1 to 8, wherein the at least one hole defines an oval cross-section.

Clause 10. The clutch assembly of any one of clauses 1-8, further comprising a controller including control circuitry, wherein the controller is configured to selectively engage and disengage the inner cone member and the outer cone member from each other.

Clause 11. The clutch assembly of clause 10, wherein the controller is configured to control delivery of a fluid to the at least one hole in the inner cone member to remove heat from the inner cone member.

Clause 12. A method of operating a cone clutch assembly, the method comprising engaging an inner cone member with the outer cone member, wherein the inner cone member is rotationally coupled to a first shaft and defines a first friction surface, wherein the outer cone member is rotationally coupled to a second shaft and defines a second friction surface opposing the first friction surface, wherein, when the inner cone member is engaged with the outer cone member, the first friction surface of the inner cone member frictionally engages the second friction surface of the outer cone member such that rotational motion is transferred between the inner cone member and the outer cone member, and wherein the inner cone member includes at least one hole including an inlet near a front edge of the inner cone member and that extends through the inner cone member adjacent to the first friction surface.

Clause 13. The method of clause 12, further comprising delivering, using a fluid delivery device, a fluid to a front side of the inner cone member, wherein the delivered fluid is configured to be directed into the inlet of the at least one cooling hole and flow through the at least one cooling hole adjacent to the first friction surface.

Clause 14. The method of clause 13, wherein the fluid delivery device comprises an oil jetting device.

Clause 15. The method of clauses 13 or 14, wherein the inner cone member includes at least one ledge adjacent to the inlet, the at least one ledge being configured to direct the delivered fluid into the inlet of the at least one hole.

Clause 16. The method of clause 15, wherein the at least one ledge includes a radially extending member to form a fluid collection channel adjacent to the inlet of the at least one hole.

Clause 17. The method of any one of clauses 13-16, wherein the delivered fluid is configured to flow into the inlet of the at least one hole at least in part due to centrifugal forces applied on the fluid with rotation of the inner cone member when engage with the outer cone member.

Clause 18. The method of any one of clauses 12 to 17, wherein the at least one hole terminates adjacent to a back edge of the inner cone member.

Clause 19. The method of any one of clauses 12 to 18, wherein the at least one hole includes at least one through hole extending from the at least one hole to the first friction surface.

Clause 20. The method of any one of clauses 12 to 19, wherein the at least one hole defines an oval cross-section.

Clause 21. The method of any one of clauses 12-20, further comprising selectively engaging and disengaging, using a controller including control circuitry, the inner cone member and the outer cone member from each other.

Clause 22. The method of clause 21, further comprising controlling, using the controller, the delivery of a fluid to the at least one hole in the inner cone member to remove heat from the inner cone member.

What is claimed is:

1. A cone clutch assembly comprising:
   an inner cone member configured to be rotationally coupled to a first shaft, the inner cone member defining a first friction surface; and
   an outer cone member configured to be rotationally coupled to a second shaft, the outer cone member defining a second friction surface opposing the first friction surface,
   wherein the inner cone member and outer cone member are configured to be selectively engaged and disengaged from each other,
   wherein, when the inner cone member is engaged with the outer cone member, the first friction surface of the inner cone member frictionally engages the second friction surface of the outer cone member such that rotational motion is transferred between the inner cone member and the outer cone member,
   wherein the inner cone member includes at least one hole including an inlet near a front edge of the inner cone member and that extends through the inner cone member adjacent to the first friction surface,
   wherein the assembly includes a fluid delivery device configured to deliver a fluid to a front side of the inner cone member, wherein the delivered fluid is configured to be directed into the inlet of the at least one hole and flow through the at least one hole adjacent to the first friction surface, and
   wherein the inner cone member includes at least one ledge adjacent to the inlet, the at least one ledge being configured to direct the delivered fluid into the inlet of the at least one hole.

2. The clutch assembly of claim 1, wherein the fluid delivery device comprises an oil jetting device.

3. The clutch assembly of claim 1, wherein the at least one ledge includes a radially extending member to form a fluid collection channel adjacent to the inlet of the at least one hole.

4. The clutch assembly of claim 1, wherein the delivered fluid is configured to flow into the inlet of the at least one hole at least in part due to centrifugal forces applied on the fluid with rotation of the inner cone member when engage with the outer cone member.

5. The clutch assembly of claim 1, wherein the at least one hole terminates adjacent to a back edge of the inner cone member.

6. The clutch assembly of claim 1, wherein the at least one hole includes at least one through hole extending from the at least one hole to the first friction surface.

7. The clutch assembly of claim 1, wherein the at least one hole defines an oval cross-section.

8. The clutch assembly of claim 1, further comprising a controller including control circuitry, wherein the controller is configured to selectively engage and disengage the inner cone member and the outer cone member from each other.

9. The clutch assembly of claim 8, wherein the controller is configured to control delivery of a fluid to the at least one hole in the inner cone member to remove heat from the inner cone member.

10. The clutch assembly of claim 1, wherein the at least one hole that extends through the inner cone member adjacent to the first friction surface extends along a path substantially parallel to the friction surface.

11. The clutch assembly of claim 1, wherein the fluid is configured to flow into the inlet near the front edge of the inner cone member and out of an outlet near a back edge of the inner cone member.

12. A method of operating a cone clutch assembly, the method comprising:
engaging an inner cone member with an outer cone member, wherein the inner cone member is rotationally coupled to a first shaft and defines a first friction surface, wherein the outer cone member is rotationally coupled to a second shaft and defines a second friction surface opposing the first friction surface,
wherein, when the inner cone member is engaged with the outer cone member, the first friction surface of the inner cone member frictionally engages the second friction surface of the outer cone member such that rotational motion is transferred between the inner cone member and the outer cone member,
wherein the inner cone member includes at least one hole including an inlet near a front edge of the inner cone member and that extends through the inner cone member adjacent to the first friction surface; and
delivering, using a fluid delivery device, a fluid to a front side of the inner cone member, wherein the delivered fluid is configured to be directed into the inlet of the at least one hole and flow through the at least one hole adjacent to the first friction surface,
wherein the inner cone member includes at least one ledge adjacent to the inlet, the at least one ledge being configured to direct the delivered fluid into the inlet of the at least one hole.

13. The method of claim 12, wherein the fluid delivery device comprises an oil jetting device.

14. The method of claim 12, wherein the at least one ledge includes a radially extending member to form a fluid collection channel adjacent to the inlet of the at least one hole.

15. The method of claim 12, wherein the delivered fluid is configured to flow into the inlet of the at least one hole at least in part due to centrifugal forces applied on the fluid with rotation of the inner cone member when engage with the outer cone member.

16. The method of claim 12, wherein the at least one hole terminates adjacent to a back edge of the inner cone member.

17. The method of claim 12, wherein the at least one hole includes at least one through hole extending from the at least one hole to the first friction surface.

18. The method of claim 12, wherein the at least one hole defines an oval cross-section.

19. The method of claim 12, wherein the at least one hole that extends through the inner cone member adjacent to the first friction surface extends along a path substantially parallel to the friction surface.

20. The method of claim 12, wherein the fluid is configured to flow into the inlet near the front edge of the inner cone member and out of an outlet near a back edge of the inner cone member.

* * * * *